Dec. 31, 1940.    M. H. A. LINDSAY    2,227,147
PHOTOELECTRIC BURGLAR ALARM SYSTEM
Filed March 24, 1938    2 Sheets-Sheet 1

INVENTOR
M. H. A. LINDSAY
BY *A. A. Smith*
ATTORNEY

Dec. 31, 1940.                M. H. A. LINDSAY                2,227,147
                      PHOTOELECTRIC BURGLAR ALARM SYSTEM
                          Filed March 24, 1938        2 Sheets-Sheet 2

INVENTOR
M. H. A. LINDSAY
BY
ATTORNEY

Patented Dec. 31, 1940

2,227,147

UNITED STATES PATENT OFFICE 2,227,147

PHOTOELECTRIC BURGLAR ALARM SYSTEM

Maxwell H. A. Lindsay, Summit, N. J., assignor to American District Telegraph Company, New York, N. Y., a corporation of New Jersey Application March 24, 1938, Serial No. 197,937

10 Claims. (Cl. 250—41.5)

The present invention relates to alarm systems, and more particularly to an automatic burglar alarm system operable upon interception of a beam of visible or invisible radiation transmitted from and received by the appropriate components of the system.

It is a well known fact that a beam of visible or infra red light may be projected from a source to a receiving unit containing a photoelectric cell in conjunction with a suitable vacuum tube, amplifier, detector, and alarm or indicator relay, in such a manner as to constitute a protective system. If the source and receiver are separated and so situated that the light beam falls at the position where it is desired to detect intrusion, an alarm will result when a person or object intercepts the beam at that point. Thus, door and window openings, passageways, floor areas, and other similar spaces may be protected against unauthorized and unannounced intrusion by this method.

The usual forms of such photoelectric burglar alarm systems operate on the absolute principle, i. e., the amount of light reaching the cell surface determines the voltage on the control grid of the associated vacuum tube. If only a single tube is used, the alarm relay is placed in the plate circuit of the vacuum tube and the potentials are so adjusted that the plate current is high when the light is falling on the cell, and the grid voltage only slightly negative or even positive. Then, when the light beam is intercepted, the grid voltage is permitted to go to a high negative value, thereby cutting off the plate current and operating the alarm or indicator relay. If, on the other hand, the single tube system is too insensitive for the purpose, the light source may be modulated by an episcotister to produce a modulated beam of light or energy to actuate the photo cell. The cell output then, as in talking picture technique, produces an alternating current or voltage which, through the help of suitable amplifier stages may be amplified to any desired amount and then rectified to hold up the alarm or indicator relay in the same manner as described above for the single tube system.

Various disadvantages are inherent in the photoelectric detection systems of the prior art described above. For instance, in the first system the sensitivity is limited by several factors. For daytime use the receiver sensitivity is necessarily low due to the small difference between daylight intensity and the intensity of the protective light beam, and the light source must be of high intensity and therefore expensive. It is also possible to defeat the system by introducing an auxiliary light source near the receiver and thus make it possible for an intruder to pass through the protective beam without causing an alarm.

The second system presents the disadvantage of being expensive to construct and maintain and may also be defeated since an unauthorized intruder can obscure the light source and either repeatedly flash a light on the receiver or direct some other form of flashing light source on the receiver and thereby pass through the protective light beam without causing an alarm to be sent in.

In a third form of photoelectric detection system that may be termed a pulse system, changes in the amount of radiation of either visible or invisible light will cause an alarm by tripping a vacuum tube. The detector unit is usually connected to an amplifier and charges a grid condenser which biases a grid to operate the first tube. An unauthorized intruder can defeat this system by passing through the field of the detector very slowly whereby the condenser never charges to the point where the amplifier will operate and consequently no alarm results. This method is inferior to the first two described above because there is no inherent supervision of the receiver provided, it being possible to remove or obstruct the light source slowly enough not to cause an alarm. The system is also subject to false alarms resulting from automobile headlights, lightning flashes and so forth, entering the receiver.

This invention disclosed hereafter overcomes all of these disadvantages as will be explained in connection with the drawings.

The object of this invention is to provide a photoelectric burglar detecting system which is operated by any degree of interception of the light beam carrier thereby preventing defeat of the system by an intruder.

Another object of this invention is to provide a photoelectric detection system which is self-compensating in that changes of ambient light, such as daylight or artificial illumination, will not cause the system to give an alarm and which cannot be defeated by using a flash-light or some other form of light source.

A further object of this invention is to provide an improved photoelectric detection system wherein a variable voltage is generated by the system itself to thereby simplify the problem of amplification.

A still further object of this invention is to provide a photoelectric alarm system which employs a pair of light beams and photo-cells arranged to maintain a normal steady system condition regardless of ambient changes in light and which will always generate a varying output voltage when an unauthorized intruder intercepts either one or both of the light beams to thereby initiate an alarm or actuate an indicator.

Another object of this invention is to provide a photoelectric detection system which is extremely sensitive and self-compensating during changes of ambient illumination but which does not require the use of a high intensity light source or an extremely sensitive receiving and amplifying system.

A further object of this invention is to provide a photoelectric system which is operated by any degree of interception of a light beam barrier and which will operate an indicating means.

Figure 1:
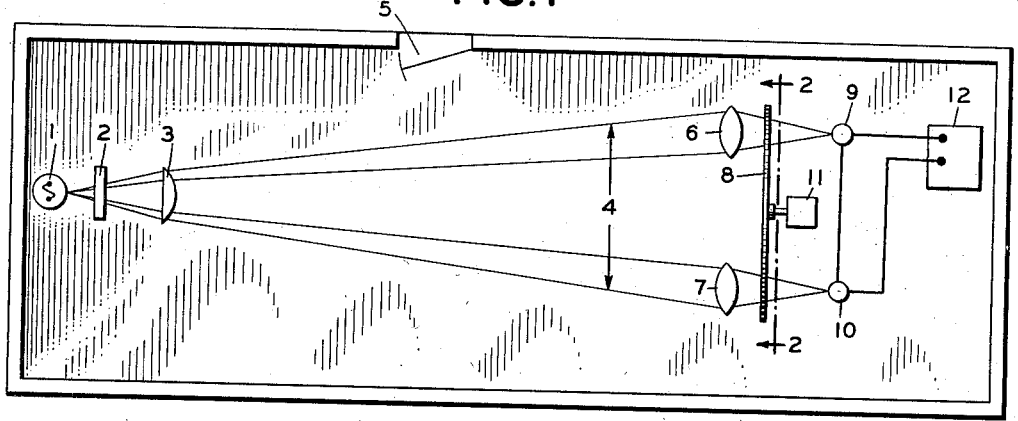
Fig. 1 illustrates diagrammatically the primary or preferred form of this invention, as set up to protect an entrance door.
Figure 2:
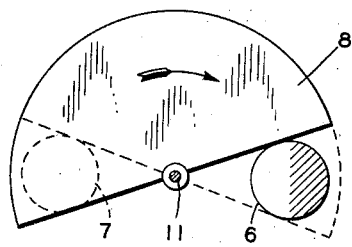
Fig. 2 shows the preferred form of light chopper.

Fig. 1 of the drawings shows the photoelectric detection system as applied to a room having a door or window 5 therein. The light source 1 is arranged to project a beam 4 of either visible or invisible light in such a manner that a barrier exists before the door or window 5. If the invisible energy is to be used the color filter 2 is interposed between the light source 1 and lens 3. Lenses 6 and 7 divide the light from the source 1 into two light beams which are directed to the photoelectric cells 9 and 10. A light chopper driven by the motor 11 is arranged to chop both of the light beams in such a manner that the output of the photoelectric cells 9 and 10 always has a constant voltage. Fig. 2 shows the arrangement of the chopper 8 in relation to the lenses 6 and 7. It is to be noted that since chopper 8 is in the form of a semi-circle, it will always expose a constant lens area so that a constant amount of light energy passes the chopper 8 so long as both light beams are unobstructed. The photoelectric cells 9 and 10 are connected to the usual form of amplifier 12 which may in turn be connected to a relay means to operate the ordinary form of alarm or indicating means.

Figure 6:
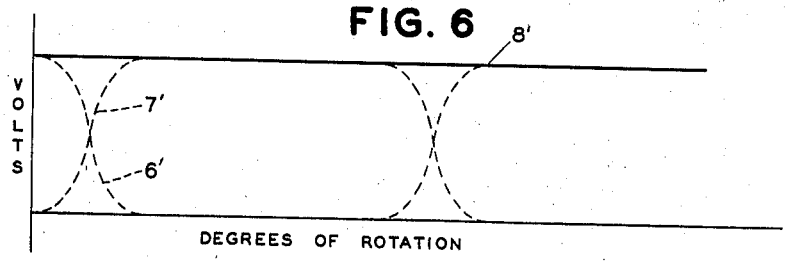
Figs. 6, 7 and 8 are graphs illustrating the operating characteristics of the detecting system shown in Fig. 1.
Figure 7:
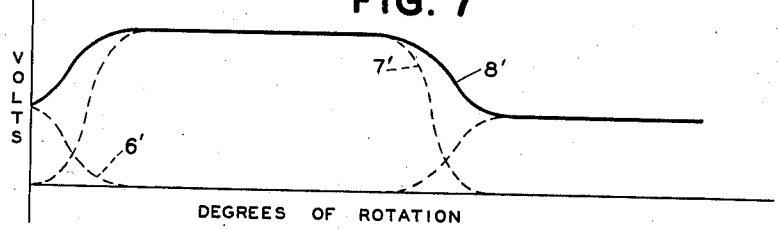
Figure 8:
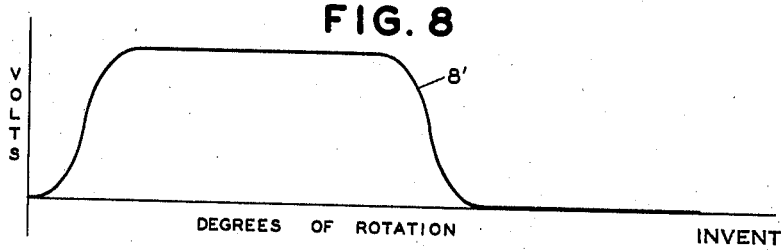

Figs. 6, 7 and 8 illustrate the manner in which the voltages of the outputs of cells 9 and 10 will vary both during normal operation and during interception of the light beam by an intruder or other unannounced person. For instance, during the normal operation, the light chopper 8 will always expose a constant lens area and therefore the voltage output will be constant as shown by the curves 8' of Fig. 6. This is evident when we consider the performance of the light chopper in more detail. Referring to Fig. 2 the light chopper 8 will rotate in a clockwise direction and the leading edge will pass the lens 6 to cut off the light beam. As the leading edge progresses across the lens 6 the amount of light intercepted will increase at an increasing rate until the lens is half covered as shown by the curve 6' in Fig. 6 and then as the lower half of lens 6 is covered, the quantity of light cut off will decrease at a decreasing rate until the lens is completely covered. During this same interval of time the light beam passed by the lens 7 is being increased as shown by the curve 7' in Fig. 6 and when the light passed by the lens 6 has decreased to zero, the light passed by the lens 7 will be at a maximum and therefore by referring again to Fig. 6 the sum of the curves 6' and 7' will be a straight line as shown by the line 8'. Thus, it is evident that during normal operation the output voltage of the cells 9 and 10 will be constant. Now, considering an interception of the light beam by an intruder, it is found that the voltage of the output of cells 9 and 10 will be variable. For instance, let it be assumed that one-half of the light beam passed by the lens 6 is cut off by the intruder. Fig. 7 shows the resulting variation in the voltage of the output. As before, the curve 6' indicates the amount of light passed by the lens 6 except that only one half of the amount of light is passing through the lens.

Meanwhile, as the light chopper 8 rotates it eventually exposes the lens 7 as indicated above to thereby vary the output of the photoelectric cell 10 in the manner shown by curve 7' of Fig. 7. Thus the resultant output of the photoelectric cell 10 amounts to a voltage impulse which will be amplified in the amplifier 12 and result in actuation of an indicator or alarm. As the light chopper continues to rotate the lens 7 will be covered by the chopper 8 and the lens 6 will be exposed again so that the voltage in photoelectric cell 9 will attain one half its normal value as shown by the curve 8' in Fig. 7. When the light chopper 8 again exposes the lens 7 another voltage impulse will result as before. Thus the resultant output of the photo cells 9 and 10 amounts to a series of impulses which can be amplified in the ordinary form of alternating current amplifier to operate the alarm or indicator relay. As the light beam 4 is progressively intercepted by an unauthorized intruder he will completely cut off the light to lens 6. As a result of this, the photoelectric cell 10 will be the only one to excite the amplifier and the curve 8' in Fig. 8 shows the resulting voltage characteristic. As the light chopper continues to rotate a series of impulses such as that shown in Fig. 8 will be impressed upon the amplifier 12 and thereby initiate an alarm or actuate an indicator.

Figure 3:
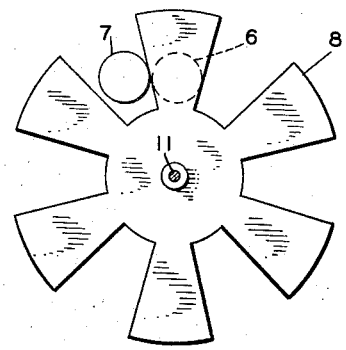
Fig. 3 shows an alternative form of light chopper.

Fig. 3 shows an alternative form of light chopper which comprises a plurality of opaque sectors. The lenses 6 and 7 will be arranged as shown in this figure so that as one lens is exposed the other lens will be cut off, and the resulting voltage impulses in the amplifier circuit will be the same as those shown in Figs. 6, 7 and 8 except that they will have a much higher frequency.

Figure 4:
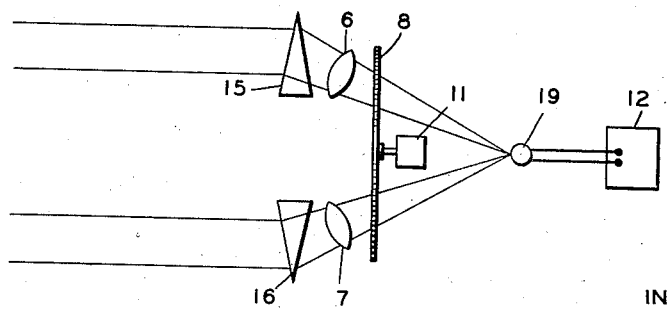
Fig. 4 shows an alternative form of the optical system shown in Fig. 1.

Fig. 4 shows an alternative form of optical system wherein only one photoelectric cell 19 is necessary. The prisms 15 and 16 in combination with lenses 6 and 7 are arranged to direct two light beams to the single photoelectric cell 19. The operation of this modification will be the same in all respects as that described in connection with Fig. 1.

Figure 5:
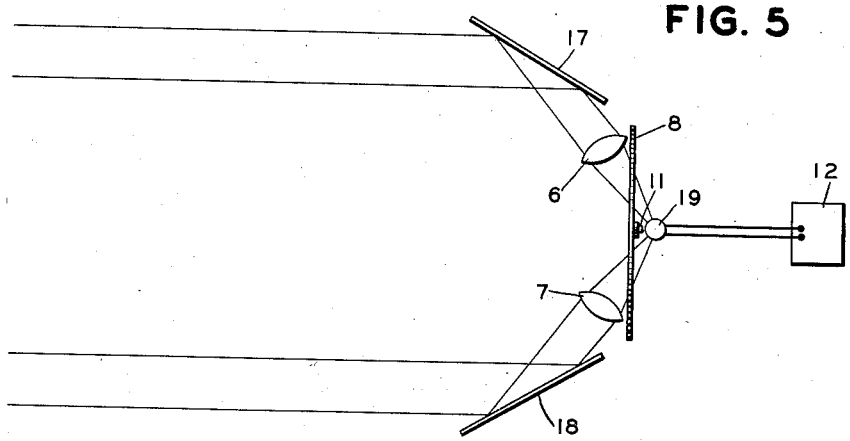
Fig. 5 shows another alternative form of the optical system.

Fig. 5 shows another modification similar to that shown in Fig. 4 except that mirrors 17 and 18 are substituted for the prisms 15 and 16. Detailed description of the operation of this modification is unnecessary since it is obvious in view of the description in connection with Fig. 1.

All of the photoelectric systems described above overcome the disadvantages of the previous systems. Changes in ambient light are compensated since the change in quantity of light is equal with respect to both photoelectric cells thereby maintaining a direct current output which cannot be amplified or cause a false alarm. This same characteristic of the system prevents the use of a flashing light source for the purpose of defeating the system. An intruder cannot defeat the system by slowly passing through the beam of light since any decrease in light, however small, will generate a varying voltage and cause an alarm. Furthermore, the above photoelectric system must merely be sensitive enough to detect the decrease in quantity of light. Therefore, sensitive receiving means or a powerful light source is not necessary.

Further modifications and uses of this system are possible. The system may be used for purposes of counting objects or articles or for any purposes where indications of acts are desired.

I claim:

1. In combination, a light source, an optical system for converting light from said source into two light beams, a pair of photo cells arranged to convert said light beams into electrical energy of constant voltage, and a semi-circular chopper so arranged with respect to said optical system that the sum of the cell outputs is constant and interception of a light beam will cause the output of said cells to have varying voltage, an amplifier connected to said photo cells and means connected thereto for operating an alarm system.

2. In combination, a light source, an optical system for converting light from said source into two light beams, photo-electric means arranged to convert said light beams into electrical energy of constant voltage and a chopper so arranged with respect to said optical system that the output of said means is constant and interception of a light beam will cause the output of said means to have varying voltage, an amplifier connected to said electrical means and means connected thereto for operating an alarm system.

3. In combination, a light source, an optical system for converting light from said source into two light beams, said optical system comprising a pair of lenses and a pair of prisms arranged to direct said light beams to a particular point, a photo-cell arranged to receive said light beams and convert said light beams into electrical energy of constant voltage, and a semi-circular chopper so arranged with respect to said optical system that the output of said cell is constant and interception of a light beam will cause the output of said cell to have varying voltage, an amplifier connected to said photo-cell and means connected thereto for operating an alarm system.

4. In combination, an enclosure having an opening therein, a light source for projecting light across said opening, an optical system for converting light from said source into two light beams, a photo-cell arranged to convert said light beams into electrical energy of constant voltage, said optical system comprising two mirrors adapted to deflect said light beams onto said photo-cell, a chopper so arranged with respect to said optical system that the output of said cell is constant and interception of a light beam will cause the output of said cell to have varying voltage and means responsive to the varying voltage to operate an alarm system.

5. In combination, a light source, a pair of lenses spaced apart to divide light from said source into two protective light beams, a light chopper cooperating with said lenses and shaped to normally pass a constant amount of light and to pass a varying amount of light when one light beam is intercepted, a photoelectric means for receiving and converting said light into electric energy whereby modification of either of said light beams causes a varying voltage, an amplifier connected to said photoelectric means and means responsive to the varying voltage for operating an alarm system.

6. In a protective alarm system, means for creating two light beams extending across an area to be protected, means for converting said beams into electrical energy, means for chopping said beams in such a manner that the output of said converting means is constant and will vary in voltage when one of said beams is modified by an intruder in said area and indicating means responsive to said varying electrical energy.

7. In combination, an enclosure having an opening therein, a light source for projecting a beam across said opening, an optical system arranged to divide the light from said source into two beams, means for receiving said light beams and converting said beams into electrical energy of constant voltage, a light chopper arranged so that the output of said receiving means is constant and to vary the voltage of said energy when one of said beams is intercepted by an intruder and means responsive to the varying voltage for operating an alarm system.

8. In combination, a light source, a pair of lenses spaced apart to divide light from said source into two beams, a light chopper cooperating with said lenses to normally pass a constant amount of light and to pass a varying amount of light when one light beam is intercepted, a photoelectric means for receiving and converting said light into electric energy whereby modification of either of said light beams causes a varying voltage and alarm means responsive to said energy.

9. In a protective alarm system, a light source, an optical system for dividing light from said source into a plurality of beams extending across an area to be protected comprising a pair of mirrors and a pair of lenses cooperating therewith, said mirrors deflecting said light to a point in space, a photo-cell for receiving said light, a light chopper for normally passing a constant quantity of light and passing a varying quantity of light when one beam is intercepted by an intruder in said area and signal means responsive to said varying light.

10. In combination, an enclosure having an opening therein, a light source for projecting light across said opening, an optical system for converting light from said source into two light beams, a photo-cell arranged to convert said light beams into electrical energy of constant voltage, said optical system comprising two mirrors adapted to deflect said light beams onto said photo-cell and a chopper so arranged with respect to said optical system that the output of said cell is constant and interception of a light beam will cause the output of said cell to have varying voltage and a signal responsive to said voltage.

MAXWELL H. A. LINDSAY.